United States Patent Office 3,137,701
Patented June 16, 1964

3,137,701
PROCESS FOR THE PREPARATION OF 6-DEOXY-6-FLUOROMORPHINES, 6-DEOXY - 6 - FLUOROCODEINES, AND RELATED COMPOUNDS
Donald E. Ayer, Portage Township, Kalamazoo County, Mich., assignor to The Upjohn Company, Kalamazoo, Mich., a corporation of Delaware
No Drawing. Filed Apr. 19, 1962, Ser. No. 188,849
4 Claims. (Cl. 260—285)

This invention pertains to novel chemical compounds and a novel process for preparing the same. More particularly, the invention is directed to 6-deoxy-6-fluoromorphines and 6-deoxy-6-fluorocodeines, to pharmacologically acceptable acid addition salts thereof, and to a novel process for replacing the 6-hydroxyl group of morphines and codeines with a fluorine atom by reacting the alkaloids with a tertiary amine fluorinating agent.

Morphine and codeine are analgesics of universal repute. However, they both exhibit objectionable toxicities, side effects, and addictive action which have motivated investigators to develop substitute analgesics such as dihydromorphinone, meperidine hydrochloride (N-methyl-4-phenyl-4-carbethoxypiperidine hydrochloride), methadon hydrochloride (6 - dimethylamino-4,4-diphenyl-3-heptanone hydrochloride), and others of commercial importance.

Likewise, chloro, bromo, and iodo derivatives of codeine have been prepared. However, 6-deoxy-6-bromo- and 6-deoxy-6-iodocodeine cannot be obtained, because, apparently, there is an almost immediate rearrangement to the more stable 8-position or the 6-halo compounds are not formed [see Stork and Clarke, J. Am. Chem. Soc. 78, 4619 (1956)]. The 6-deoxy-6-chloro- derivatives of morphine and codeine have been obtained and they exhibit analgesic activity. However, they are less active and less stable than the 6-deoxy-6-fluoromorphines and 6-deoxy-6-fluorocodeines of this invention and do not possess the advantageous attenuation of side effects.

It has now been found in accordance with this invention that 6-deoxy-6-fluoromorphines and 6-deoxy-6-fluorocodeines are active analgesics and central nervous system stimulants like the parent alkaloids, but in addition they possess pharmacologic advantages. Illustratively, 6-deoxy-6-fluorocodeine is a more active analgesic than codeine when administered orally, and side effects are reduced. Similarly, 6-deoxy-6-fluoromorphine is an analgesic as active as morphine, but it elicits only comparatively mild side effects.

Moreover, in accordance with the process of this invention, it has now been found that substitution of the fluorine atom for the 6-hydroxyl group in morphines and codeines can be accomplished with a fluorinating agent having the formula:

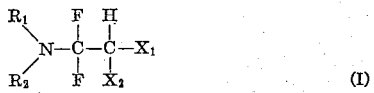

(I)

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with

constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon, in an inert organic solvent, whereby the 6-hydroxyl group of the morphine or codeine starting material (in the form of an acid addition salt) is replaced by fluorine.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "saturated heterocyclic radical containing from 5 to 7 ring atoms, inclusive" includes pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, thiamorpholino, piperidino, 2-methylpiperidino, 3-methylpiperidino, and like alkylpiperidino groups, hexamethyleneimino, 2-methylhexamethyleneimino, homomorpholino, and the like.

Examples of fluorinating agents having the Formula I are N-(2-chloro-1,1,2-trifluoroethyl)diethylamine, N-(1,1,2,2 - tetrafluoroethyl)diethylamine, N-(2-chloro-1,1,2-trifluoroethyl)dimethylamine, N-(2-chloro-1,1,2-trifluoroethyl)diisobutylamine, N - (2 - chloro - 1,1,2 - trifluoroethyl) dioctylamine, N - (2 - chloro - 1,1,2 - trifluoroethyl)methylethylamine, N - (2,2 - dichloro - 1,1 - difluoroethyl)diethylamine, N - (1,1,2,3,3-hexafluoropropyl)diethylamine, N - (1,1,2,2-tetrafluoroethyl)diisopropylamine, and the like. The preferred fluorinating agent for use in the process of the invention is N-(2-chloro-1,1,2-trifluoroethyl) diethylamine.

The term "inert organic solvent" means any organic solvent which does not react with the fluorinating agent and in which the morphine and codeine starting materials (i.e., as acid addition salts) are appreciably soluble such as aromatic and aliphatic hydrocarbons, halogenated hydrocarbons, esters, ketones, ethers, and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, tert-butyl alcohol, tert-amyl alcohol, methylene chloride, chloroform, carbon tetrachloride, ethylene dichloride, ethylidene chloride, propylene chloride, trimethylene chloride, and the like.

The process of the invention is carried out in the presence of an acid. The acid is present in excess of the amount required to neutralize the tertiary amino group of the morphine or codeine starting material, the excess acid serving as catalyst. Conveniently, the excess acid initially present in the reaction mixture is of the order of about 0.1 to about 25 percent of the starting alkaloid on a mole-equivalent basis. Acids suitable for these purposes include proton-forming acids such as the hydrogen halides, phosphoric acid, sulfuric acid, and the like or Lewis acids (see Fieser and Fieser, "Organic Chemistry," third edition, page 138, Reinhold, 1956), such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ in the manner described hereinafter.

The process of the invention is carried out conveniently by bringing together the morphine or codeine starting material, the fluorinating agent, and the acid catalyst, in the presence of an inert organic solvent. The temperature at which the reaction is carried out can range from about −40° C. to about 50° C. However, a preferred temperature range is between about 0° C. and about 30° C. The desired 6-deoxy-6-fluoromorphine or 6-deoxy-6-fluorocodeine is recovered from the reaction mixture and purified by conventional procedures, for example, basification and solvent extraction of the reaction mixture followed by removal of the solvent and recrystallization. If desired the product can be purified by chromatographic procedures.

Advantageously, the fluorinating agent having the Formula I above is employed in excess of the stoichiometric quantity based on the starting alkaloid. Preferably, it is present to the extent of about 1.1 to 10 moles per mole of alkaloid.

When the acid employed in the process of the invention is hydrogen fluoride, the latter can be added to the reaction mixture as such or can be generated in situ, for example, by addition of the requisite quantity of water or a lower alkanol such as methanol, ethanol, and the like, to produce the desired quantity of hydrogen fluoride by reaction with the fluorinating agent as follows:

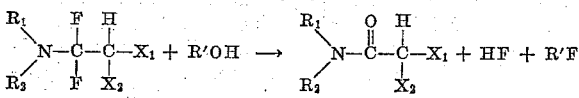

wherein R' represents hydrogen, methyl, ethyl, and other lower-alkyl. Preferably, the inert organic solvent is a halogenated hydrocarbon of the kind illustrated above.

In many instances the yield of fluoro alkaloid obtained in the process of the invention can be increased significantly by the incorporation in the reaction mixture of a tertiary amine hydrofluoride. Tertiary amine hydrofluorides which can be employed for this purpose are those having the formula $R_3R_4R_5N \cdot HF$ wherein $R_3$, $R_4$, and $R_5$ are selected from the class consisting of lower-alkyl, as hereinbefore defined, and aralkyl from 7 to 13 carbon atoms, inclusive, and $R_3$ and $R_4$ taken together with $>$N— constitute a saturated heterocyclic radical containing from 5 to 7 ring atoms, inclusive, as hereinbefore defined.

The term "aralkyl" means an aralkyl group containing from 7 to 13 carbon atoms, inclusive, such as benzyl, phenethyl, phenylpropyl, benzhydryl, and the like.

Examples of tertiary amine hydrofluorides having the formula $R_3R_4R_5N \cdot HF$ are the hydrofluorides of trimethylamine, triethylamine, tripropylamine, tributylamine, triisobutylamine, trioctylamine, diethylbenzylamine, methyldiethylamine, propyldimethylamine, N-methylpyrrolidine, N,2,2-trimethylpyrrolidine, N-methylpiperidine, N,2-dimethylpiperidine, N,N'-dimethylpiperazine, N,N'-diethylpiperazine, N-methylmorpholine, N-ethylmorpholine, and the like.

Advantageously, the tertiary amine hydrofluorides, when employed in the process of the invention, are present in a proportion within the range of about 1 mole to about 20 moles per mole of the 6-hydroxyalkaloid starting material.

The process of the invention is applicable broadly to the fluorination (by replacement of the 6-hydroxyl group) of morphines and codeines, and the thus-produced novel compounds of this invention comprise free bases of the following structural formula:

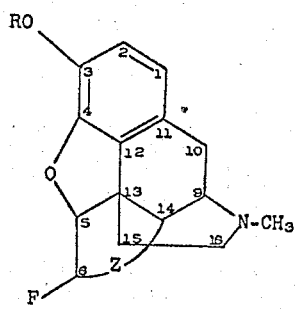

(II)

wherein R is selected from the group consisting of hydrogen, methyl, and hydrocarbon acyl of from 1 to 8 carbon atoms, inclusive, for example, formyl, acetyl, propionyl, butyryl, valeryl, hexanoyl, heptanoyl, octanoyl, and isomeric forms thereof, benzoyl, p-toluoyl, and the like, and Z is selected from the group consisting of ethylene and vinylene, and pharmacologically acceptable acid addition salts thereof.

The 6-deoxy-6-fluoromorphine and 6-deoxy-6-fluoro-codeine of the invention (compounds having the Formula II, above, wherein R is hydrogen or methyl and Z is vinylene) are obtained by fluorinating morphine or codeine in the manner described.

Likewise, the 6-deoxy-6-fluorodihydromorphine and 6-deoxy-6-fluorodihydrocodeine of the invention (compounds having the Formula II, above, wherein R is hydrogen or methyl and Z is ethylene) are obtained by fluorinating dihydromorphine or dihydrocodeine in the manner described. The compounds are also readily obtained by hydrogenating 6-deoxy-6-fluoromorphine or 6-deoxy-6-fluorocodeine in the presence of an inert organic solvent such as acetic acid, propionic acid, and the like and a hydrogenation catalyst such as platinum oxide, palladium-on-charcoal, and the like. The corresponding dihydro compounds are recovered by conventional methods.

The 3-hydrocarbon acylates of morphine and dihydromorphine can be fluorinated in accordance with the process described above. A preferred method, however, for obtaining these compounds of the invention comprises esterifying the 3-hydroxyl group of 6-deoxy-6-fluoromorphine or 6-deoxy-6-fluorodihydromorphine. Illustratively, 6-deoxy-6-fluoromorphine or 6-deoxy-6-fluorodihydromorphine can be reacted with an acylating agent, illustratively, an acid anhydride or an acid halide, for example, acetic anhydride or acetyl chloride, in the presence of an inert organic solvent (which if desired can also contain an acid acceptor, for example, triethylamine, pyridine, and the like), and recovering the thus-obtained 6-deoxy-6-fluoromorphine 3-acylate or 6-deoxy-6-fluorodihydromorphine 3-acylate.

The acid adition salts of the invention comprise the salts of 6-deoxy-6-fluoromorphines and 6-deoxy-6-fluorocodeines having the structural Formula II with acids. The acid addition salts can be prepared by conventional methods. For example, 6-deoxy-6-fluoromorphine can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting a 6-deoxy-6-fluoromorphine or 6-deoxy-6-fluorocodeine acid addition salt with an acid which is stronger than the acid comprising the acid moiety of the starting salt. A pharmacologically acceptable acid addition salt can be prepared using acids such as sulfuric, hydrochloric, hydrobromic, nitric, phosphoric, benzoic, p-toluenesulfonic, salicylic, acetic, propionic, lactic, pamoic, citric, succinic, and like pharmacologically acceptable acids.

The compounds having Formula II above and the acid addition salts of this invention can be formulated in compositions for oral and parenteral administration in the same manner as morphine and codeine.

For oral administration, the compounds having Formula II or their acid addition salts can be formulated with a pharmaceutical carrier to give solid or fluid unit dosage forms, such as tablets, capsules, powders, granules, solutions, syrups, elixirs, and the like. Illustratively, tablets are prepared from a powder mixture by granulating, adding a lubricant, and forming in a die. Likewise, for example, a syrup is prepared by dispersing a morphine or codeine according to Formula II or an acid addition salt thereof in a suitably flavored aqueous sucrose solution.

For parenteral administration, the compounds of Formula II or their acid addition salts, can be formulated in dilute aqueous solutions, aqueous suspensions, and oil dispersions for intramuscular injection, intravenous drip, vascular perfusion, or like routes. If desired, aqueous media such as water for injection, sterile glucose solution, normal saline solution, glucose-saline solution, Ringer's solution, and the like can be used. If desired, a measured amount of powdered compound according to Formula II or an acid addition salt is placed in a vial and the vial and its contents sterilized and sealed. An accompanying vial of sterile water for injection is provided as a vehicle to form a solution or suspension prior to administration.

The compositions described hereinbefore can include other analgetic agents such as 3-p-chlorophenoxy-2-hydroxypropyl carbamate, prostigmine methylsulfate, aspirin, acetophenetidin, salicylamide, and N-acetyl-p-aminophenol; hypnotic agents such as the barbiturates and chloral hydrate; steroids such as hydrocortisone, prednisolone, methylprednisolone, and 6α-fluoroprednisolone; muscle relaxants such as chlorzoxazone, carisoprodol, mephenesin, meprobamate, phenaglycodol, and zoxazolamine; and antihistamines such as chlorpheniramine maleate, thenylpyramine fumarate, prophenpyridamine, and pyrilamine.

The amount to be administered varies, of course, with many well-known factors, e.g., age, weight, condition, route, and the like. However, a suitable dosage on a body-weight basis for animals and humans (including infants) is about 0.1 mg. to 0.4 mg. per kilogram.

The following examples describe some preferred forms and practices of this invention, but they are not to be construed as limiting the scope thereof.

PREPARATION 1

*N-(2-Chloro-1,1,2-Trifluoroethyl)Diethylamine*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to −40° C. and the tube was then sealed, placed in an ice bath and allowed to warm slowly at room temperature. The tube and contents were then allowed to stand for 48 hours at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine in the form of a liquid having a boiling point of 33° to 34° C. at a pressure of 6 mm. of mercury.

Using the above procedure, but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, and 2-methylpiperidine, there are obtained N-(2-chloro-1,1,2-trifluoroethyl)dimethylamine, N - (2-chloro-1,1,2-trifluoroethyl) diisopropylamine, N - (2-chloro-1,1,2-trifluoroethyl)dibutylamine, N-(2-chloro-1,1,2-trifluoroethyl)pyrrolidine, N-(2-chloro-1,1,2-trifluoroethyl) - 2′ - methylpyrrolidine, N-(2-chloro-1,1,2-trifluoroethyl) - 2′,2′ - dimethylpyrrolidine, N-(2-chloro-1,1,2-trifluoroethyl) - 4′ - methylpiperazine, N-(2-chloro - 1,1,2-trifluoroethyl)morpholine, N-(2-chloro-1,1,2 - trifluoroethyl)piperidine, and N-(2-chloro-1,1,2-trifluoroethyl)-2′-methylpiperidine, respectively.

Similarly, using the procedure of Preparation 1, but replacing trifluorochloroethylene by 2,2-dichloro-1,1-difluoroethylene there is obtained N-(2,2-dichloro-1,1-difluoroethyl)diethylamine.

Similarly, using the procedure of Preparation 1, but replacing trifluorochloroethylene by perfluoropropene there is obtained N-(1,1,2,3,3,3-hexafluoropropyl)diethylamine.

EXAMPLE 1

*Preparation of 6-Deoxy-6-Fluorocodeine and the Hydrochloride and Phosphate Thereof*

PART A.—6-DEOXY-6-FLUOROCODEINE

Ten ml. (0.063 mole) of N-2-chloro-1,1,2-trifluoroethyl)diethylamine was added to 25 ml. of methylene chloride containing 0.8 ml. (0.02 mole) of methanol. The solution was held for 30 minutes at 25° C. and was then mixed with a cold (5° C.) solution of 0.0165 mole of codeine (prepared from 7 g. of codeine phosphate sesquihydrate) in 50 ml. of methylene chloride. The reaction mixture was allowed to stand for 16 hours at 5° C., ice-water was added, and the organic layer was separated. After extracting the organic solution with three portions of water, the water extracts and the original aqueous layer were combined, washed twice with ether, made basic with cold aqueous potassium hydroxide solution, and extracted with methylene chloride. After drying the methylene chloride extracts over anhydrous magnesium sulfate, the methylene chloride was evaporated to give 3.5 g. of crude 6-deoxy-6-fluorocodeine. The crude 6-deoxy-6-fluorocodeine was dissolved in methylene chloride and chromatographed on a column of magnesium silicate (Florisil). Linear gradient elution with increasing concentrations of acetone in technical hexane (Skellysolve B, essentially a mixture of isomeric hexanes having a boiling range of 60° to 70° C.) and evaporation of eluate gave 2.6 g. of crystalline 6-deoxy-6-fluorocodeine in the first 1040 ml. of eluate (0 to 17.5% acetone). A 1.4 g. sample was recrystallized two times from aqueous methanol, and there was obtained 0.91 g. of 6-deoxy-6-fluorocodeine melting at 141° to 143° C.

*Analysis.*—Calc'd for $C_{18}H_{20}FNO_2$: C, 71.74; H, 6.96; F, 6.30; N, 4.65. Found: C, 71.56; H, 7.07; F, 6.10; N, 4.54.

Optical rotation: $[\alpha]_D^{20°}$ −119° (c. 0.9, chloroform).

Characteristic infrared absorption frequencies (mineral oil mull): 2795, 1640, 1610, 1505, 1443, 1335, 1278, 1245, 1150, 1115, 1106, 1055, 1045, 1030, 944, 915, 865, 800, 795 cm.$^{-1}$.

PART B.—6-DEOXY-6-FLUOROCODEINE HYDROCHLORIDE

A solution of 0.7 g. of 6-deoxy-6-fluorocodeine in methanol was acidified with 0.25 ml. of concentrated hydrochloric acid and evaporated under reduced pressure to a glass. Two crystallizations from acetone gave 6-deoxy-6-fluorocodeine hydrochloride (solvated with an equimolar amount of acetone) melting at 168° to 172° C.

*Analysis.*—Calc'd for $C_{18}H_{21}ClFNO_2 \cdot C_3H_6O$: C, 63.70; H, 6.88; Cl, 8.96; F, 4.80; N, 3.54. Found: C, 63.57; H, 6.99; Cl, 9.18; F, 4.34; N, 3.31.

The unsolvated hydrochloride is obtained by heating this solvate at 100° C. under reduced pressure.

PART C.—6-DEOXY-6-FLUOROCODEINE PHOSPHATE

To a hot solution of 3.19 g. of 6-deoxy-6-fluorocodeine in 90 ml. of absolute ethanol was added with stirring, 10.6 ml. of 1 N phosphoric acid (prepared by diluting 1.0 ml. of 85% phosphoric acid to 14.8 ml. with absolute ethanol). The reaction mixture was cooled to 5° C. and filtered. There was thus obtained 4.1 g. of 6-deoxy-6-fluorocodeine phosphate as a fluffy white powder which lost 0.69 percent of its weight on drying at 100° C. under reduced pressure and melted at 223° to 224° C.

*Analysis.*—Calc'd for $C_{18}H_{23}FNO_6P$: C, 54.13; H, 5.80; N, 3.51; P, 7.76. Found: C, 53.87; H, 5.55; N, 3.61; P, 7.83.

Optical rotation: $[\alpha]_D^{24°}$ −87° (c. 0.74, water).

Characteristic infrared absorption frequencies (mineral oil mull): 2360, 1607, 1505, 1050, 951 cm.$^{-1}$.

EXAMPLE 2

*Preparation of 6-Deoxy-6-Fluoromorphine*

Ten ml. of N-(2-chloro-1,1,2-trifluoroethyl)diethylamine is mixed with 25 ml. of methylene chloride containing 0.8 ml. of methanol. The solution is allowed to stand 30 minutes at 25° C. and is then added to a suspension of 5 g. of morphine in 500 ml. of methylene chloride. After stirring the reaction mixture for about 16 hours at about 5° C., ice-water is added and the organic layer is extracted with three portions of water. The aqueous extracts and original aqueous layer are combined and washed twice with ether, basified with cold aqueous potassium carbonate solution, and extracted with methylene chloride. After drying over anhydrous magnesium sulfate and evaporating the methylene chloride there is obtained crude 6-deoxy-6-fluoromorphine which is dissolved in a mixture of methylene chloride and acetone and chromatographed on a column of 100 g. of magnesium silicate (Florisil). Elution with increasing concentrations of acetone (0 to 50% acetone) in methylene chloride gives, on evaporation of solvent, crystalline 6-deoxy-6-fluoromorphine. The product is further purified by recrystallization from aqueous ethanol.

EXAMPLE 3

Preparation of 6-Deoxy-6-Fluoromorphine 3-Acetate(Ester)

A suspension of 1 g. of 6-deoxy-6-fluoromorphine and 4 ml. of acetic anhydride in 50 ml. of ethylene dichloride is heated under reflux for one hour. The solution is cooled, and extracted with three portions of cold dilute aqueous hydrochloric acid. The aqueous acid extracts are combined, washed with ether, made alkaline with ammonium hydroxide, and extracted with ether. The ether extract is dried over anhydrous magnesium sulfate and evaporated to give 6-deoxy-6-fluoromorphine 3-acetate as a crystalline solid.

EXAMPLE 4

Preparation of 6-Deoxy-6-Fluorodihydrocodeine

A solution of 11.7 g. of 6-deoxy-6-fluorocodeine hydrochloride in 40 ml. of glacial acetic acid is hydrogenated in the presence of 100 mg. of platinum oxide catalyst under atmospheric pressure for one hour. The reaction mixture is diluted with water and filtered. After adding 300 ml. of ether and making alkaline with ammonium hydroxide, the ether layer is separated, dried over anhydrous magnesium sulfate, and evaporated to give 6-deoxy-6-fluorodihydrocodeine as a crystalline solid.

EXAMPLE 5

Preparation of 6-Deoxy-6-Fluorodihydromorphine

Following the procedure of Example 1, but substituting dihydromorphine for codeine, there is prepared 6-deoxy-6-fluorodihydromorphine.

EXAMPLE 6

Preparation of 6-Deoxy-6-Fluorodihydromorphine 3-Butyrate(Ester)

Following the procedure of Example 3, but substituting butyric anhydride for acetic anhydride, and 6-deoxy-6-fluorodihydromorphine for 6-deoxy-6-fluoromorphine, there is prepared 6-deoxy-6-fluorodihydromorphine 3-butyrate.

EXAMPLE 7

Preparation of 6-Deoxy-6-Fluoromorphine 3-Octanoate(Ester)

Following the procedure of Example 3, but substituting octanoic anhydride for acetic anhydride, there is prepared 6-deoxy-6-fluoromorphine 3-octanoate.

EXAMPLE 8

Preparation of 6-Deoxy-6-Fluoromorphine 3-Benzoate(Ester)

Following the procedure of Example 3, but substituting benzoic anhydride for acetic anhydride, there is prepared 6-deoxy-6-fluoromorphine 3-benzoate.

EXAMPLE 9

Ten thousand (10,000) scored tablets for oral use, each containing 20 mg. of 6-deoxy-6-fluorocodeine phosphate, is prepared from the following ingredients:

| | G. |
|---|---|
| 6-deoxy-6-fluorocodeine phosphate | 200 |
| Lactose | 3950 |
| Starch | 500 |
| Magnesium stearate | 50 |

The ingredients are mixed and slugged. The slugs are screened and pressed into tablets. The tablets so prepared can be used in the control of intractable pain at the rate of 1 to 2 tablets 1 to 4 times a day.

I claim:
1. The process for preparing 6-deoxy-6-fluoromorphines and codeines of the following structural formula

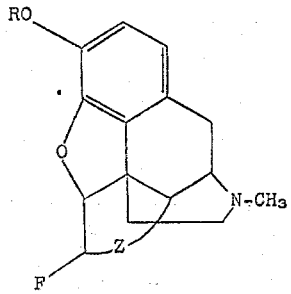

wherein R is selected from the group consisting of hydrogen, methyl, and hydrocarbon acyl of from 1 to 8 carbon atoms, inclusive, and Z is selected from the group consisting of ethylene and vinylene which comprises reacting an acid addition salt of morphines and codeines of the formula

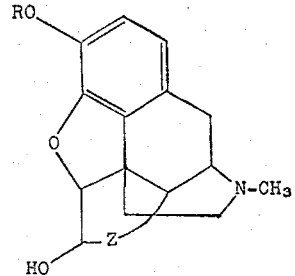

wherein R and Z are as defined above with a tertiary amine fluorinating agent of the formula

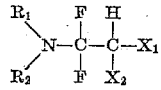

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with —N< constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon, in the presence of an inert organic solvent containing an acid catalyst whereby the 6-hydroxyl group is replaced by the fluorine atom.

2. The process for preparing 6-deoxy-6-fluorocodeine according to claim 1 by replacement of the 6-hydroxyl group with fluorine which comprises reacting codeine acid addition salt with N-(2-chloro-1,1,2-trifluoroethyl)diethylamine.

3. The process according to claim 2 wherein the acid catalyst is a hydrohalic acid.

4. The process according to claim 3 wherein the acid catalyst is hydrogen fluoride.

References Cited in the file of this patent

UNITED STATES PATENTS 2,806,033   Lewenstein et al. _____ Sept. 10, 1957

OTHER REFERENCES

Small et al.: J. Am. Chem. Soc., vol 53, pp. 2215, 2221–3, and 2236 (1931).

Small et al.: J. Am. Chem. Soc., vol. 55, pp. 2875 and 2877 (1933).

Eddy: Chemistry and Industry, pp. 1462–8 (1959).